UNITED STATES PATENT OFFICE.

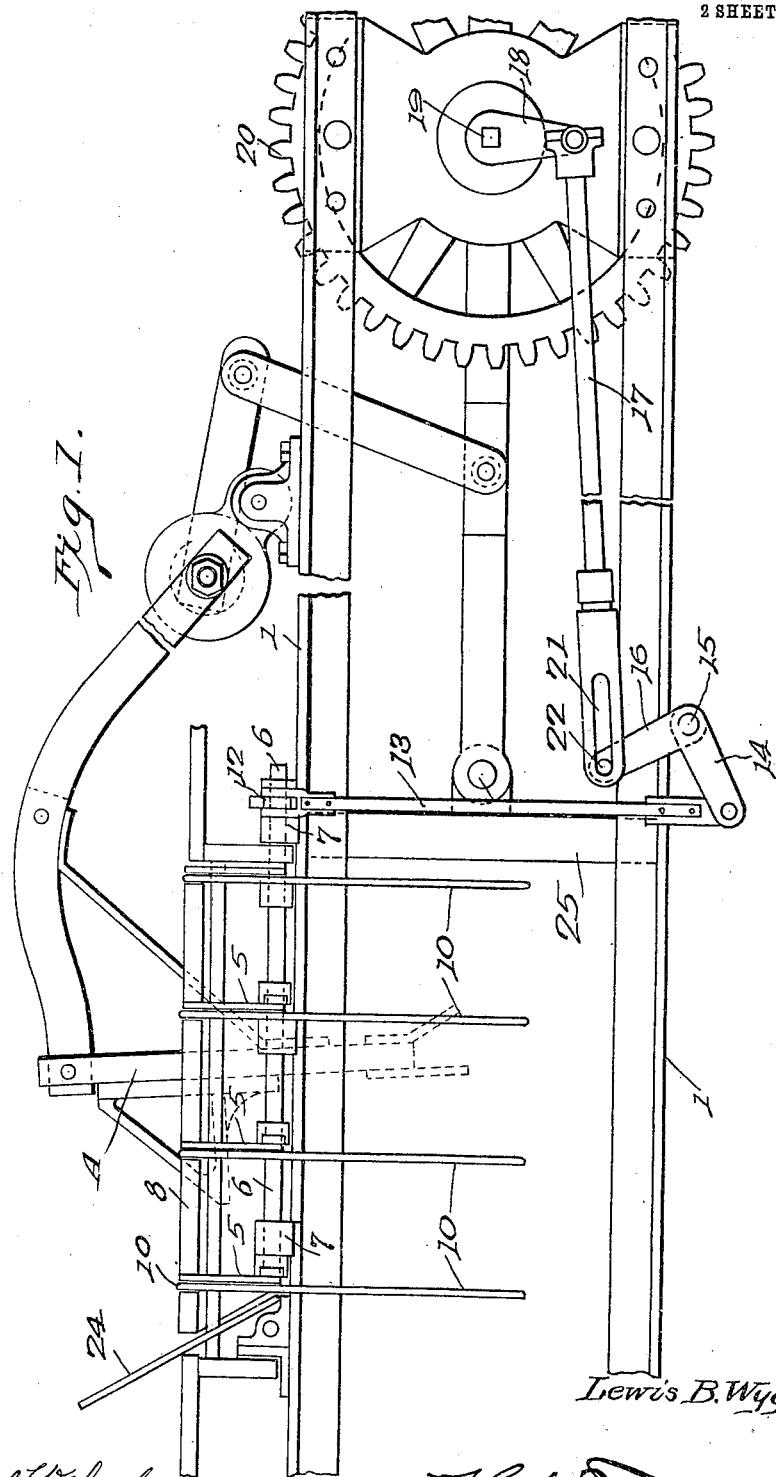

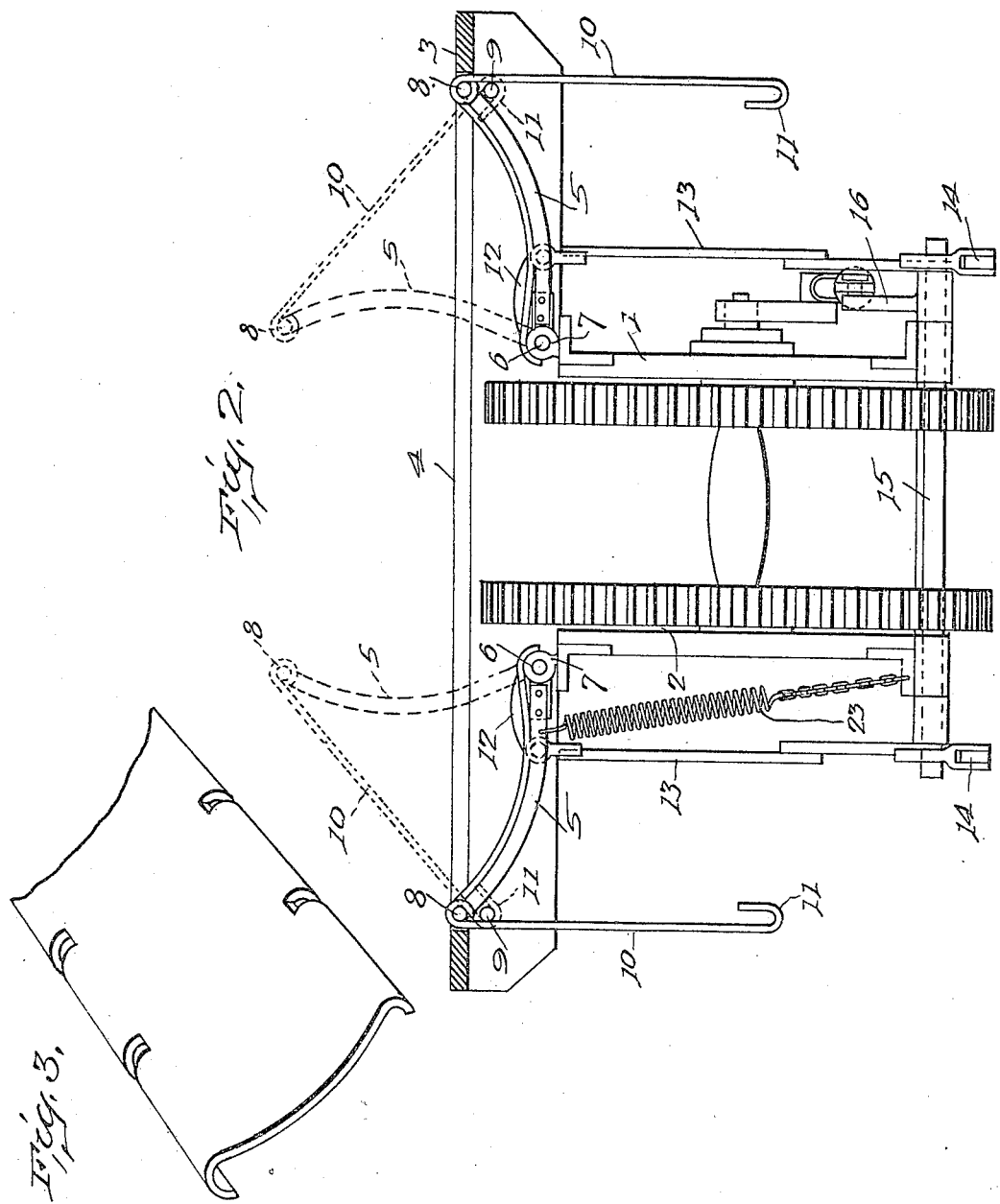

LEWIS B. WYGANT, OF BELLEVUE, OHIO, ASSIGNOR TO THE OHIO CULTIVATOR COMPANY, OF BELLEVUE, OHIO, A CORPORATION OF OHIO.

CONDENSER FOR HAY-PRESSES, &c.

957,291.  Specification of Letters Patent.  Patented May 10, 1910.

Application filed April 28, 1909. Serial No. 492,642.

*To all whom it may concern:*

Be it known that I, LEWIS B. WYGANT, a citizen of the United States, residing at Bellevue, in the county of Huron and State of Ohio, have invented certain new and useful Improvements in Condensers for Hay-Presses and the Like, of which the following is a specification, reference being had therein to the accompanying drawings.

This invention relates to condensers for hay presses and the like, and the object of the invention is to provide a device of this character which will condense a large quantity of hay or other material into a comparatively small bundle, thereby enabling the feeder to force the entire quantity of hay into the path of the compressing plunger by a single operation. It is also an object of the invention to provide such a device which, when in its idle position, will be so located as to not interfere with the operation of the other parts of the machine or with the movements of the operator; in which the condensing members will move in a vertical plane; in which the condensing members will be positively actuated from the driving mechanism for the press; in which the movement of the condensing members will be positively limited; in which means will be provided for preventing the hay or other material from entering in the rear of the condensing members; in which means will be provided for interrupting the movement of said condensing members without interrupting the movement of the actuating mechanism therefor; and which will be simple in its construction and efficient in its operation.

With these objects in view my invention consists in certain novel features and in certain combinations and arrangements of parts hereinafter to be described, and then more particularly pointed out in the claims.

In the accompanying drawings, Figure 1 is a side elevation of a portion of a press embodying my invention; Fig. 2 is a transverse section of such a press, showing an end elevation of my invention; and Fig. 3 is a detail view of a slightly modified form of condensing member.

In these drawings I have illustrated one embodiment of my invention and have shown the same as applied to a hay press of ordinary construction comprising a main frame 1 provided with the usual feed opening or hopper 2, through which the hay is fed to the condensing plunger by means of the usual feeder A. Mounted upon the main frame 1 is a feeding platform 3 having an opening 4 arranged immediately above the feed opening 2 of the main frame. In the operation of the machine a quantity of hay is thrown upon the feeding platform 3 above the feed opening or hopper in the main frame. This hay will spread out on all sides of the opening in the feeding platform, and, when the feeder descends, it will engage that portion of the hay lying above the opening and will force that portion of the hay into the hopper or feed opening in the main frame, but will leave upon the feeding platform a considerable portion of the hay which lies beyond the edges of the opening therein. To enable the feeder to so engage the hay as to force all of it into the hopper or feed opening at a single operation I have enlarged the opening 4 in the feeding platform 3 and have extended the same for a considerable distance beyond the sides of the feed opening in the main frame. Immediately beneath the outwardly extended portions of the opening 4 I have arranged suitable condensing members which are pivotally mounted at their inner ends upon the main frame near the opposite sides of the feed opening 2 and having their outer ends so arranged as to pass freely through the opening 4. These condensing members are preferably mounted to move about horizontal axes and are operatively connected to some moving part of the press. In the present instance I have shown each condensing member as comprising a group of arms 5, arranged substantially parallel and rigidly connected one to the other so that they will move in unison. In the present instance the several arms comprising each member are rigidly secured at their inner ends to horizontal shafts 6, which are journaled in bearings 7 mounted on the main frame 1 and are arranged on opposite sides of the feed opening 2. The outer ends of the arms are also preferably connected one to the other by means of a rod or bar 8 secured thereto and serving to maintain the outer or free ends of the arms in alinement. Any suitable number of arms may be employed and their arrangement and the manner of connecting the same may be varied to meet varying conditions. If desired, the arms 5 may be spaced some distance apart and the space between the same closed by means of a covering of sheet metal or the like, as is more clearly shown in Fig. 3.

The arms 5 are preferably curved in such a manner that, when in their idle positions, the outer or free ends thereof will lie substantially flush with the feeding platform 3. A bar or rod 9, arranged parallel with the shafts 6 on each side of the main frame, serves to limit the downward movement of the condensing members or arms 5. To limit the upward movement of these members or arms suitable rods 10 are loosely secured to the bars 8 connecting the outer ends of the arms 5. The rods 10 extend on the outer side of the rods 9, which are mounted just beneath the feeding platform 3, and, as the condensing members or arms are moved upwardly into their condensing positions, the rods 10 will ride over the rods 9. Each rod 10 is provided at its lower end with an inwardly turned hook 11 which is so arranged that, when the condensing members have reached the upper limit of their movement, it will engage the rod 9 and form a positive stop for the condensing members. If desired, several of these rods or stops 10 may be employed, and, when the condensing members are in their uppermost position, these rods will extend across the space between the feeding platform 3 and the condensing member and form a guard to prevent the entrance of hay or other material in the rear of the condensing members.

The condensing members are preferably actuated simultaneously from some moving part of the press. In the present instance I have shown each of the shafts 6 as provided with a crank arm 12 which is connected by means of a pitman 13 with a crank 14 mounted on a rockshaft 15 which extends transversely to the press, the two shafts 6 being connected to the opposite ends of the rockshaft 15. The rockshaft 15 is provided with a second crank arm 16 which extends at an angle to the crank arms 14 and is here shown as connected, by means of a pitman 17, with a part of the driving mechanism for the compressing plunger 25. In the present instance I have shown the pitman 17 as connected to a crank 18 carried by a shaft 19 upon which are mounted the driving gears 20 for the compressing plunger. Thus, it will be seen that each rotation of the shaft 19, and, consequently, each reciprocation of the compressing plunger, will cause the condensing members 5 to complete a single operation. It is desirable, however, that the condensing members or arms should remain in their idle position for a length of time sufficient to enable the desired quantity of hay or other material to be placed upon the feeding platform above the feed opening 2. In order to thus interrupt the movement of the condensing members without interrupting the movement of the actuating mechanism I have provided the pitman 17 with a longitudinal slot 21 which receives a pin 22 secured to the crank arm 16. As the pitman 17 begins its return movement the condensing members will move downwardly either of their own accord or through the medium of a spring 23 extending between the crank arm 12 of one of the shafts 6 and a fixed part of the main frame. When the condensing members reach their lowermost position the pin 22 will still be at the forward end of the slot 21. Consequently, the pitman will move forward the length of the slot and then rearward the same distance before it again comes into operative engagement with the pin 22, and, thus, the condensing members will remain stationary during this movement of the pitman. This period of idleness is sufficient to enable the necessary amount of hay to be placed on the platform above the opening 2.

The forward side of the hopper or feed opening 2, i. e., the side opposite the feeder, may, if desired, be provided with an inclined guide or plate 24 which facilitates the compressing of the hay into a compact bundle.

In the operation of the machine that portion of the hay placed upon the feeding platform 3, which lies beyond the opposite sides of the feed opening 2, will lie above the condensing members, and, as these members move upwardly, the hay will be condensed into a compact bundle immediately above the feed opening, thus permitting the same to be so engaged by the feeder as to force the entire bundle of hay into the feed opening and into the path of the plunger.

It will be apparent that the condenser is of such a character that it normally occupies a position in which it does not interfere in any way with the operation of the other parts of the machine or with the movements of the operator; that the condensing members move in a vertical plane, thus moving the hay into a position above the feed opening; that the condensing members are positively actuated from a part of the driving mechanism of the press and that this actuation is so controlled that the condensing members will remain stationary for a predetermined period sufficient to permit the desired quantity of hay to be placed on the feeding platform above the same; that means have been provided for positively limiting the movement of the condensing members and for preventing the entrance of hay in the rear of the same; and that the device as a whole is exceedingly simple in its construction and operation and is possessed of a high degree of efficiency.

I wish it to be understood that I do not desire to be limited to the details of construction shown and described, for obvious modifications will occur to a person skilled in the art.

Having thus fully described my invention, what I claim as new and desire to secure by Letters Patent, is:—

1. In a machine of the character described, the combination, with a frame having a feed opening therein, of condensing mechanism comprising condensing members arranged along the sides of said feed opening and supported normally in substantially horizontal positions, means for moving said condensing members into substantially vertical positions, feeding mechanism independent of said condensing mechanism and comprising a feeder supported normally above said feed opening and adapted to enter the same between said condensing members, and separate means for actuating said feeding mechanism.

2. In a machine of the character described, the combination, with a frame having a feed opening therein, of condensing mechanism comprising condensing members arranged along the sides of said feed opening and supported in substantially horizontal positions, means for moving said condensing members into substantially vertical positions, feeding mechanism independent of said condensing mechanism and comprising a feeder adapted to enter said feed opening, means for limiting the movement of said condensing members to prevent them from entering the path of said feeder, and separate means for actuating said feeding mechanism.

3. In a machine of the character described, the combination, with a frame having a feed opening therein, of a condensing mechanism comprising shafts journaled on opposite sides of said feed opening, groups of condensing arms secured to each of said shafts and normally supported in a substantially horizontal position, and means for actuating said shafts to move said condensing arms into substantially vertical positions, and feed mechanism independent of said condensing mechanism and comprising a feeder supported normally above said feed opening and adapted to enter the same between the two groups of condensing arms.

4. In a machine of the character described, the combination, with a frame having a feed opening therein, of a condensing mechanism comprising shafts journaled on opposite sides of said feed opening, groups of condensing arms secured to each of said shafts and normally supported in a substantially horizontal position, means for actuating said shafts to move said condensing arms into substantially vertical positions, a rod connected to each group of condensing arms and having a hook-shaped end, a stop carried by said frame and arranged to be engaged by the hook-shaped end of said rod, and feeding mechanism independent of said condensing mechanism and comprising a feeder adapted to enter said feed opening.

5. In a machine of the character described, the combination, with a frame having a feed opening, of a plurality of groups of arms mounted on horizontal axes on opposite sides of said feed opening, a rod connecting the outer ends of the arms on each side of said feed opening, a second rod loosely mounted on said first-mentioned rod and having a hook-shaped lower end, and a stop carried by said frame and adapted to be engaged by the hook-shaped end of said last-mentioned rod.

6. In a machine of the character described, the combination, with a frame having a feed opening, and a feeding platform mounted on said frame, having an opening arranged above said feed opening and extending on opposite sides thereof, of condensing members mounted on said main frame beneath said feeding platform, and means for actuating said condensing members to move the free ends thereof through the opening in said feeding platform.

7. In a machine of the character described, the combination, with a frame having a feed opening, and a feeding platform mounted on said frame and having an opening arranged above said feed opening and extending beyond the opposite sides thereof, of a plurality of groups of arms pivotally mounted on said main frame on opposite sides of said feed opening and beneath said feeding platform, said arms being so arranged that their free ends lie substantially flush with said feeding platform when in their normal positions, and means for moving said arms about their pivotal centers.

8. In a machine of the character described, the combination, with a frame having a feed opening, and a feeding platform having an opening arranged above said feed opening and extending beyond the opposite sides thereof, of a plurality of groups of arms pivotally mounted on the opposite sides of said feed opening, rods loosely connected to the outer ends of said arms and having hook-shaped lower ends, and stops carried by said main frame beneath said feeding platform and adapted to be engaged by said hook-shaped rods.

9. In a machine of the character described, the combination, with a frame having a feed opening, a shaft journaled on each side of said feed opening, a condensing member carried by each of said shafts, a crank arm secured to each of said shafts, a rockshaft mounted in said frame, and pitmen connecting each of said crank arms to said rockshaft, and means for actuating said rockshaft.

10. In a machine of the character described, the combination, with a frame having a feed opening, condensing members pivotally mounted on opposite sides of said feed opening, a pitman operatively connected to a moving part of said machine, and means for loosely connecting said pitman to said condensing members, whereby the movement of said condensing members may be interrupted without interrupting the operation of said machine.

11. In a hay press, the combination, with a main frame having a feed opening, a plunger, and driving mechanism therefor, of a shaft journaled on each side of said feed opening, a crank arm carried by each of said shafts, a rockshaft journaled in said main frame, pitmen for connecting said crank arms to said rockshaft, and means for operatively connecting said rockshaft to the driving mechanism for said plunger.

12. In a hay press, the combination, with a main frame having a feed opening, a plunger, and driving mechanism therefor, of a shaft journaled on each side of said feed opening, a crank arm carried by each of said shafts, a rockshaft journaled in said main frame, a pitman for connecting said crank arms to said rockshaft, a crank arm rigidly secured to said rockshaft and having a pin in one end thereof, and a pitman having a slot at one end adapted to receive said pin and operatively connected at its other end to the driving mechanism for said plunger.

13. In a machine of the character described, a condensing member comprising a plurality of parallel arms pivotally mounted on a common axis, and means for closing the spaces between said arms.

14. In a machine of the character described, a condensing member comprising a plurality of parallel arms pivotally mounted on a common axis, and a covering of sheet metal extending over said arms and closing the spaces between the same.

In testimony whereof, I affix my signature in presence of two witnesses.

LEWIS B. WYGANT.

Witnesses:
E. A. KEMP,
E. H. ERDRICH.